July 10, 1956
J. WEISSBRODT
2,753,755
CINEMATOGRAPH APPARATUS
Filed April 21, 1954
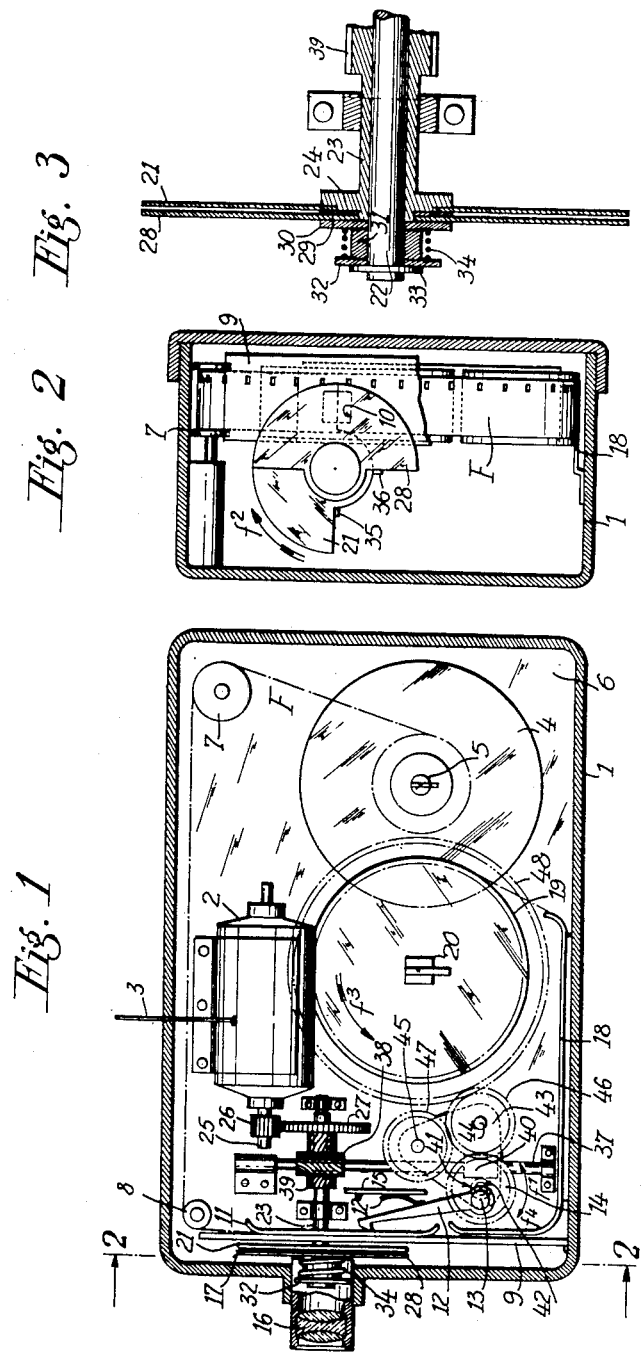
Jean Weissbrodt
INVENTOR
By Richardson, David and Nordon
his ATTYS.

United States Patent Office 2,753,755
Patented July 10, 1956

2,753,755
CINEMATOGRAPH APPARATUS

Jean Weissbrodt, Paris, France, assignor to Societe Nouvelle Pathe Cinema, Paris, France, a French body corporate Application April 21, 1954, Serial No. 424,721

Claims priority, application France November 13, 1953

5 Claims. (Cl. 88—18.4)

The present invention relates to a cinematograph apparatus such as a camera or projector comprising an automatic shutter. It is frequently necessary to modify the exposure time in such apparatuses for taking into account the lighting of the subject to be filmed or for modifying the brightness of the image projected.

In certain types of cinematograph apparatuses it is not possible to have access to the shutter for this adjustment or it is not desirable that this adjustment be left to inexperienced operators.

Thus, certain apparatuses for taking aerial photographs, such as a photo gun, which are used when training pilots in firing or for aerial observation, are mounted at the end of the wings of the aircraft and are not accessible in flight. Thus, it is necessary to set the shutter of these apparatuses on the ground in accordance with a given lighting. This practically rules out any photographing in other lighting conditions encountered in flight.

Furthermore, certain cinematograph projectors for amateurs exist for projecting films of several sizes, generally two. This requires re-setting shutter so as to obtain images of satisfactory brightness for each size. This necessitates opening the apparatus and effecting adjustments which are tedious and delicate in inexperienced hands.

The present invention aims to remedy these disadvantages. It has for object to provide a cinematograph apparatus comprising an automatic shutter, which operates in an extremely simple manner and more or less automatically without need for direct access to the apparatus.

This apparatus comprises a first shutter blade integral with a shaft, said blade being adapted to mask intermittently during its rotation the exposure window or the projecting window of the apparatus, and a second shutter blade rotative on this shaft and frictionally connected with fixed elements, this second blade being adapted, either to coincide with the first blade for one direction of rotation of this shaft or to unfold relative to the first blade for the other direction of rotation of this shaft for changing the value of the exposure time, and cooperating abutments on the two blades for maintaining the second blade in one or the other of its two positions and causing said second blade to be driven by said first blade; and said apparatus is provided with an electric motor drivingly connected with said shaft, a film feeding means operatively connected to said shaft, said means being adapted to feed the film in one direction independent of the direction of rotation of said shaft, a film driving means and means interposed between said film driving means and said shaft for imparting to said film driving means a movement independent of the direction of rotation of said shaft, a reversible electric motor operatively connected to said shaft, and a switch for reversing the direction of rotation of said motor.

It can be seen therefore that if it is desired to modify the exposure time, it is merely necessary to reverse the direction of rotation of the driving shaft by acting on the reversing device. It is true that only two exposure times are in this way obtained but this in general suffices for the aforementioned cinematograph apparatuses. Hence, in photo guns, two positions of the shutter are all that are required, one being for bright weather, the other for overcast weather. Further, in the projectors capable of projecting two sizes of film, one exposure time is all that is necessary for each size.

Other features and advantages of the invention will appear from the ensuing description with reference to the accompanying drawing given merely by way of example and in which:

Fig. 1 is a diagrammatic longitudinal sectional view of an aerial photograph apparatus or a photo gun which incorporates a shutter according to the invention, Fig. 2 is a sectional view along line 2—2 of the apparatus shown in Fig. 1, and Fig. 3 is a fragmentary cross-sectional view on a larger scale of the shutter.

In the illustrated embodiment, the shutter is incorporated in an aerial photograph apparatus. This apparatus comprises in the known manner a case 1 in which is disposed a reversible electric motor 2 which drives the film and is connected by a conductor 3 to a suitable current supply through a conventional reversing switch not illustrated in the drawing. The film F is unreeled from a supply or take-off spool 4 which is rotative on a spindle 5 journalled between two support plates, i. e., a lower plate 6 and an upper parallel plate not visible in this figure. The film thereafter passes around two guide rollers 7 and 8 and thence through a passageway provided between a plate 9 provided with an exposure window 10 and a presser plate 11. Adjacent the exposure window 10, the film is driven intermittently by a claw 12 mounted on an eccentric 13 which is carried by a gear wheel 14 rotated by the motor 2 in the manner explained hereinunder. This claw 12 is provided with a return spring 12a which bears against an abutment 15 and thus maintains the claw in contact with the film. In the course of its passage before the window 10, the film is exposed through an optical system 16 during the periods when it is unmasked by a rotative shutter 17. The film thus exposed thereafter passes round a guide 18 and attains the receiving or take-in spool 19 which is keyed by flat portions to a shaft 20 mounted between the two support plates. This shaft 20 is rotated by the motor 2 in the manner described hereinunder.

According to the invention the period of masking by the shutter 17 and hence the exposure time may be regulated. To this end, the shutter comprises a shutter blade 21 having in the illustrated example a semi-circular form (Figs. 2 and 3). This blade 21 is integral with a sleeve 23 through a flange 24 to which it is secured. This sleeve 23 is rotative on a fixed shaft 22 and is rotated at the desired speed by the output shaft 25 of the electric motor 2 through gearing 26, 27. A second shutter blade 28, which is also semi-circular in form, is freely rotative on the sleeve 23 in front of the shutter 21. This shutter blade 28 is gripped between two washers 29, 30, the washer 29 bearing against the flange 24 and the washer 30 being mounted on the fixed axis 22.

An annular distance piece 31 is freely rotative on the fixed support shaft 22 between the washer 30 and an abutment member 32 disposed at the end of the shaft 22 and held against the sleeve 23 by a circlip 33. A spring of predetermined strength 34 is mounted on the distance piece 31 between the abutment member 32 and the washer 30. Thus, the blade 28 is frictionally connected with the blade 21 parts 30 to 34, which are, in turn frictionally connected with the fixed axis 22.

Two abutments 35 and 36 are provided on the blade 21 and extend rearwardly of the latter with respect to the front of the apparatus. These abutments are angularly spaced 90° from one another, the abutment 36 being provided on a circular part of the blade adjacent and surrounding the sleeve 23 and the abutment 35 being provided on one of the substantially rectilinear portions of this blade.

There will now be discussed in detail the driving means for transporting the film, insofar as it differs from conventional arrangements. A cross shaft 37 is driven by the sleeves 23 through helical gearing 38—39. A worm gear 40 secured to the other end of the shaft 37 meshes with a worm wheel 41 keyed to the shaft 42 of the gear 14 which drives, through the eccentric, the claw 12. On the shaft 42 is mounted to oscillate about an axis adjacent one of its apexes a triangular plate 43. Adjacent the two other apexes of this plate are mounted pins 44 and 45 which carry identical gear wheels 46 and 47 respectively. The distances between the shaft 42 and the pins 44 and 45 and the diameter of the gear wheels they carry are so selected that the gear 46 meshes with the gear 14 and with the gear 47, but the latter does not mesh with the gear 14. The gear wheels 46 and 47 are so arranged as to be capable of selectively engaging a gear wheel 48 keyed to the shaft 20, which carries the receiving spool 19.

The operation of the shutter according to the invention and that of the photographic apparatus will now be described, the operation of the latter being described only in respect of the modifications resulting from incorporation of this shutter.

The electric motor 2 is started up in one direction by acting on its switch. It will be assumed that this direction is that which rotates the gear 14 in the direction of arrow $f^1$ and causes rotation of the shutter 17 in the direction of arrow $f^2$ (Fig. 2). The receiving spool 19 is thus rotated in the direction of arrow $f^3$, corresponding to winding on the film F, through the shaft 37 the gear 40, gear 41, gears 14, 46 and 48. The gear 46 meshes directly with the gear 48 while the gear 47 is inoperative and rotates on its own. As the blade 21 is rotating in the direction of arrow $f^2$, the blade 28, which is freely mounted on the sleeve 23 and braked by the washer 30, will remain substantially stationary until the abutment 35 engages its edge (the "upper" edge in Fig. 2) and causes its rotation; the two blades 28 and 21 are then coinciding and rotate together; this position of the shutter corresponds to the maximum value of the exposure.

If the direction of rotation of the motor is reversed, the gear 14 rotates in the direction of arrow $f^4$ and the plate 43 owing to inertia rocks in the same direction so that the gear 48 this time meshes with gear 47 instead of gear 46. The gear 47, is, however, rotated by the gear 14 through the gear 46 and the direction of rotation of the gear 48 remains that indicated by arrow $f^3$. The system formed by the three gears 14, 46, 47 and the plate 43 therefore ensures that the spool 19 rotates in one direction for either direction of rotation of the motor 2. Since the operation of the claw 12 is independent of the direction of rotation of the gear 14, it is clear that the driving or transport of the film is not influenced by the direction of rotation of the motor 2. However, the shutter 17 this time rotates in the opposite direction to that of arrow $f^2$ and the blade 28 which is frictionally braked remains substantially stationary and unfolds relative to the blade 21, until the abutment 36 engages its edge (the "lower" edge in Fig. 2) and causes its rotation; the two blades 28 and 21 are then in the position shown in Fig. 2 and rotate together; this position corresponds to the minimum exposure, which is equal to half of the maximum exposure.

Thus, there is obtained a shutter which is very readily adjusted by merely acting on the motor switch. This switch may be placed on the control panel of an aircraft and the operator may easily control the exposure even though he does not have access to the apparatus located at the end of the wing of the aircraft.

The shutter according to the invention may be applied to other cinematograph apparatuses. Thus it may be mounted on a projecting apparatus capable of projecting either of two film sizes, for instance the type of apparatus described in the patent application filed of even date for "Improved Cinematograph Projecting Apparatus," Serial Number 424,677.

Although a specific embodiment of the invention has been described hereinbefore, it is to be understood that many changes and modifications may be made therein without departing from the spirit of the invention or the scope of the appended claims.

Thus, it should be mentioned that the ratio of the masking periods provided by the two positions of the shutter may be different from the ratio 1/1.5 mentioned above. For this purpose it is merely necessary to shift the abutments 35 and 36 so that they are angularly spaced apart an angle different from 90° and/or modify the relative dimensions of the two shutter blades. The abutments 35 and 36 instead of cooperating with the leading edge of the shutter 28 may cooperate with corresponding abutments formed on the latter.

Having now described my invention what I claim as new and desire to secure by Letters Patent is:

1. In a cinematograph apparatus comprising a shaft rotative in a bearing in the apparatus, a first shutter blade integral with said shaft and adapted to mask intermittently during its rotation the exposure window or the projecting window of the apparatus, a second shutter blade rotatively mounted on said shaft and frictionally connected with fixed elements, said second blade being adapted either to coincide with the first blade for one direction of rotation of said shaft or to unfold relative to said first blade for the other direction of rotation of this shaft for changing the value of the exposure time, and cooperating abutments on said blades for maintaining the second blade in one or the other of its two positions and causing said second blade to be driven by said first blade; a film feeding means operatively connected to said shaft, said film-feeding means being adapted to feed the film in one direction independent of the direction of rotation of said shaft; a film-driving means; means interposed between said film-driving means and said shaft for imparting to said film-driving means a movement independent of the direction of rotation of said shaft; a reversible electric motor operatively connected to said shaft; and a switch for reversing the direction of rotation of said motor.

2. In a cinematograph apparatus, comprising a shaft rotative in a bearing in the apparatus, a first shutter blade integral with said shaft and adapted to mask intermittently during its rotation the exposure window or the projecting window of the apparatus, a second shutter blade rotatively mounted on said shaft and frictionally connected with fixed elements, said second blade being adapted either to coincide with the first blade for one direction of rotation of said shaft or to unfold relative to said first blade for the other direction of rotation of this shaft for changing the value of the exposure time, and co-operating abutments on said blades for maintaining the second blade in one or the other of its two positions and causing said second blade to be driven by said first blade; a film transporting claw operatively connected to said shaft, said film transporting claw being adapted to feed the film in one direction independent of the direction of rotation of the shaft; a film-receiving spool for the film; means interposed between said spool and said shaft for imparting to said spool a movement independent of the rotation of said shaft; a reversible electric motor operatively connected to said shaft; and a switch for reversing the direction of rotation of said motor.

3. An aerial photograph apparatus as claimed in claim 2, comprising a shaft journalled in the apparatus, a gear wheel keyed to this shaft and driven by the motor, an eccentric integral with this gear wheel, the film transporting claw being mounted on this eccentric and including a spring which urges it into its operative position, whereby said claw acts on the film whatever the direction of rotation of said electric motor.

4. An aerial photograph apparatus according to claim 2, comprising a gear wheel integral with the receiving spool and driven by the electric motor through a gear train, this gear train including a shaft journalled in the apparatus, a second gear wheel integral with this shaft and driven by the electric motor, a plate oscillably mounted on this shaft, two gear wheels interengaging and rotatively mounted on this plate, one of these two gear wheels meshing with the second gear wheel and the movement of the latter being transmitted selectively to the gear wheel of the receiving spool by one or the other of said two gear wheels rotatively mounted in the plate according to the direction of rotation of the motor, whereby the receiving spool always rotates in the direction corresponding to winding on the film.

5. Aerial photograph apparatus as claimed in claim 2, comprising a shaft journalled in the apparatus, a first gear wheel keyed to said shaft and driven by the motor, an eccentric integral with this gear wheel, the film transporting claw being mounted on this eccentric and comprising a spring urging it to its operative film transporting position, a plate oscillably mounted on said shaft, two gear wheels interengaging and rotatively mounted on this plate, one of these two gear wheels engaging said first gear wheel, a gear wheel integral with the receiving spool, the movement of the first gear wheel being transmitted selectively to the gear wheel of the receiving spool by one or the other of said two gear wheels rotatively mounted in the plate according to the direction of rotation of the motor, whereby the film transporting claw acts on the film and the receiving spool rotates constantly in the same direction corresponding to winding on the film whatever the direction of rotation of the electric motor.

References Cited in the file of this patent

UNITED STATES PATENTS

| 995,061 | Duhem | June 13, 1911 |
| 1,609,961 | Readeker | Dec. 7, 1926 |
| 1,900,876 | Wittel | Mar. 7, 1933 |
| 2,476,576 | Bachelder | July 19, 1949 |